(12) United States Patent
Chu

(10) Patent No.: US 6,446,624 B1
(45) Date of Patent: Sep. 10, 2002

(54) SMART CIRCUIT DEVICE OF SMOKE EXHAUSTER FOR COOKING

(75) Inventor: Ming-Hung Chu, Taichung Hsien (TW)

(73) Assignee: Taiwan Sakura Corporation, Taichung Hsien (TW)

( * ) Notice: Subject to any disclaimer, the term of this patent is extended or adjusted under 35 U.S.C. 154(b) by 21 days.

(21) Appl. No.: 09/686,865

(22) Filed: Oct. 12, 2000

(51) Int. Cl.[7] .................. F24C 15/20; G05B 19/042
(52) U.S. Cl. ............... 126/299 R; 126/299 D; 126/299 F; 340/517; 706/906
(58) Field of Search .................. 126/299 R, 299 D, 126/299 F; 706/900; 700/299, 300; 364/148.05; 340/500, 501, 517; 55/DIG. 36; 454/56

(56) References Cited

U.S. PATENT DOCUMENTS

| | | | |
|---|---|---|---|
| 3,384,067 A | * 5/1968 | Rawald et al. | 126/299 R |
| 4,352,349 A | * 10/1982 | Yoho | 126/299 R |
| 4,903,685 A | * 2/1990 | Melink | 126/299 D |
| 4,910,684 A | * 3/1990 | Ostergaard et al. | 364/503 |
| 5,139,009 A | * 8/1992 | Walsh | 126/299 R |
| 5,286,943 A | * 2/1994 | Has | 126/273 R |
| 5,771,879 A | * 6/1998 | Saltzman | 126/299 R |
| 6,170,480 B1 | * 1/2001 | Melink et al. | 126/299 R |
| 6,320,501 B1 | * 11/2001 | Tice et al. | 340/517 |

FOREIGN PATENT DOCUMENTS

| | | | |
|---|---|---|---|
| DE | 197 52 358 A | * | 5/1999 |
| JP | 4-193323 A | * | 7/1992 |

* cited by examiner

Primary Examiner—Henry Bennett
Assistant Examiner—Josiah C. Cocks
(74) Attorney, Agent, or Firm—Rosenberg, Klein & Lee

(57) ABSTRACT

The present invention proposes a smart circuit device of a smoke exhauster for cooking. The smart circuit device of the present invention comprises a sensing circuit comprising a temperature sensor and a smoke sensor, a signal processing circuit of temperature sensor, a signal processing circuit of supersonic transducer, a microprocessor control circuit, an output and display circuit, a motor-driving circuit, and a power circuit. The temperature sensor is used to assist the smoke sensor (supersonic transducer). The present invention can detect the variations of the quantity of smoke and temperature in the cooking environment as input parameters to the microprocessor control circuit. The microprocessor control circuit will operate according to the fuzzy control theory to control the motor of the smoke exhauster to operate at a proper rotation speed so as to reduce noise, save energy, and achieve the object of automatic control.

3 Claims, 6 Drawing Sheets

SMART CIRCUIT DEVICE OF SMOKE EXHAUSTER FOR COOKING

FIELD OF THE INVENTION

The present invention relates to a smart circuit device of a smoke exhauster for cooking, wherein a sensor capable of detecting the quantity of smoke is installed in a central frame plate of the smoke exhauster for cooking to determine a proper rotation speed of the motor thereof. Thereby, noise can be reduced and energy can be saved.

BACKGROUND OF THE INVENTION

A general commercially available smoke exhauster for cooking uses a simple mechanical switch or an electronic push-button switch to control the rotation speed of the motor thereof. The situation that the motor operates at an improper rotation speed usually happens. For instance, the motor may operates at the highest rotation speed when the quantity of smoke is low, hence resulting in large noise and energy consuming.

Accordingly, a circuit device of a smoke exhauster for cooking has been proposed. Although the rotation speed of the motor can be controlled, this circuit device can not detect the variation of the quantity of smoke in the cooking environment. Therefore, the situation that the motor operates at an improper rotation speed still will happen. The problems of large noise and energy consuming thus can not be resolved.

SUMMARY AND OBJECTS OF THE PRESENT INVENTION

One object of the present invention is to provide a smart circuit device of a smoke exhauster for cooking, which device can detect the variations of the quantity of smoke and temperature in the cooking environment as input parameters to a fuzzy controller. Thereby, the motor of the smoke exhauster for cooking can be controlled to operate at a proper rotation speed so as to reduce noise, save energy, and achieve the object of automatic control.

Another object of the present invention is to provide a sealed supersonic transducer, which can be installed on outdoor equipment or in dusty places because of its sealed structure.

The various objects and advantages of the present invention will be more readily understood from the following detailed description when read in conjunction with the appended drawings, in which:

DETAILED DESCRIPTION OF PREFERRED EMBODIMENT

Figure 1:
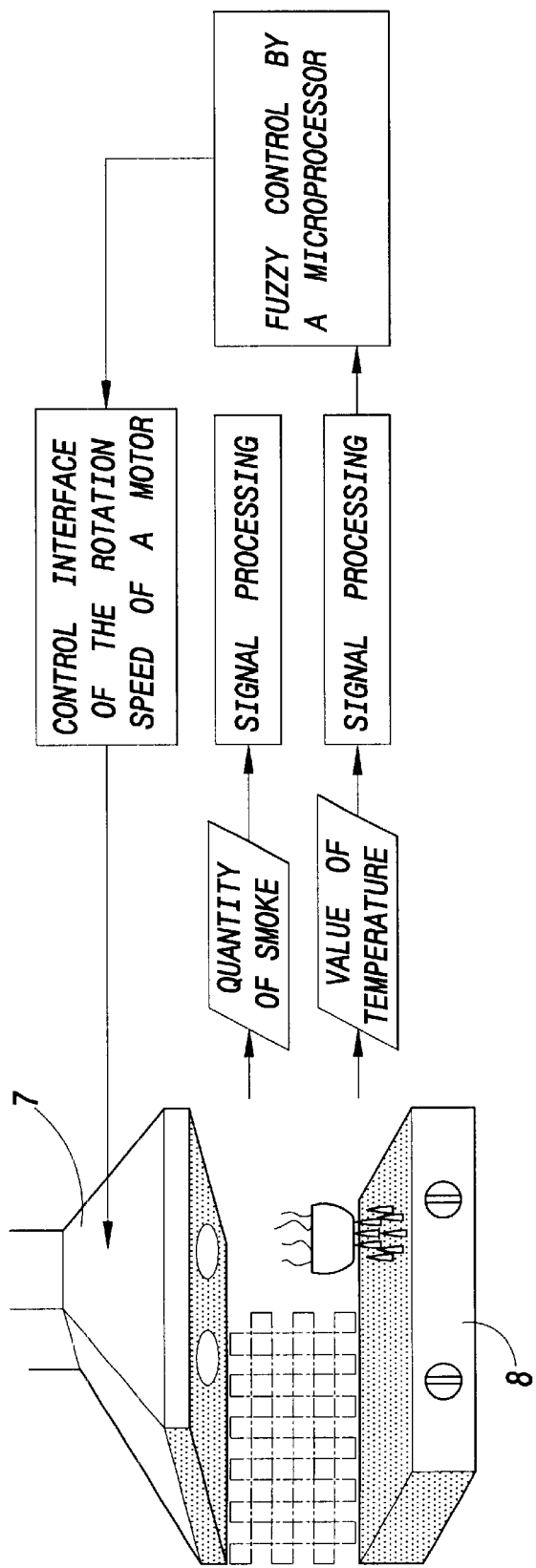
FIG. 1 shows a function diagram of the present invention.
Figure 2:
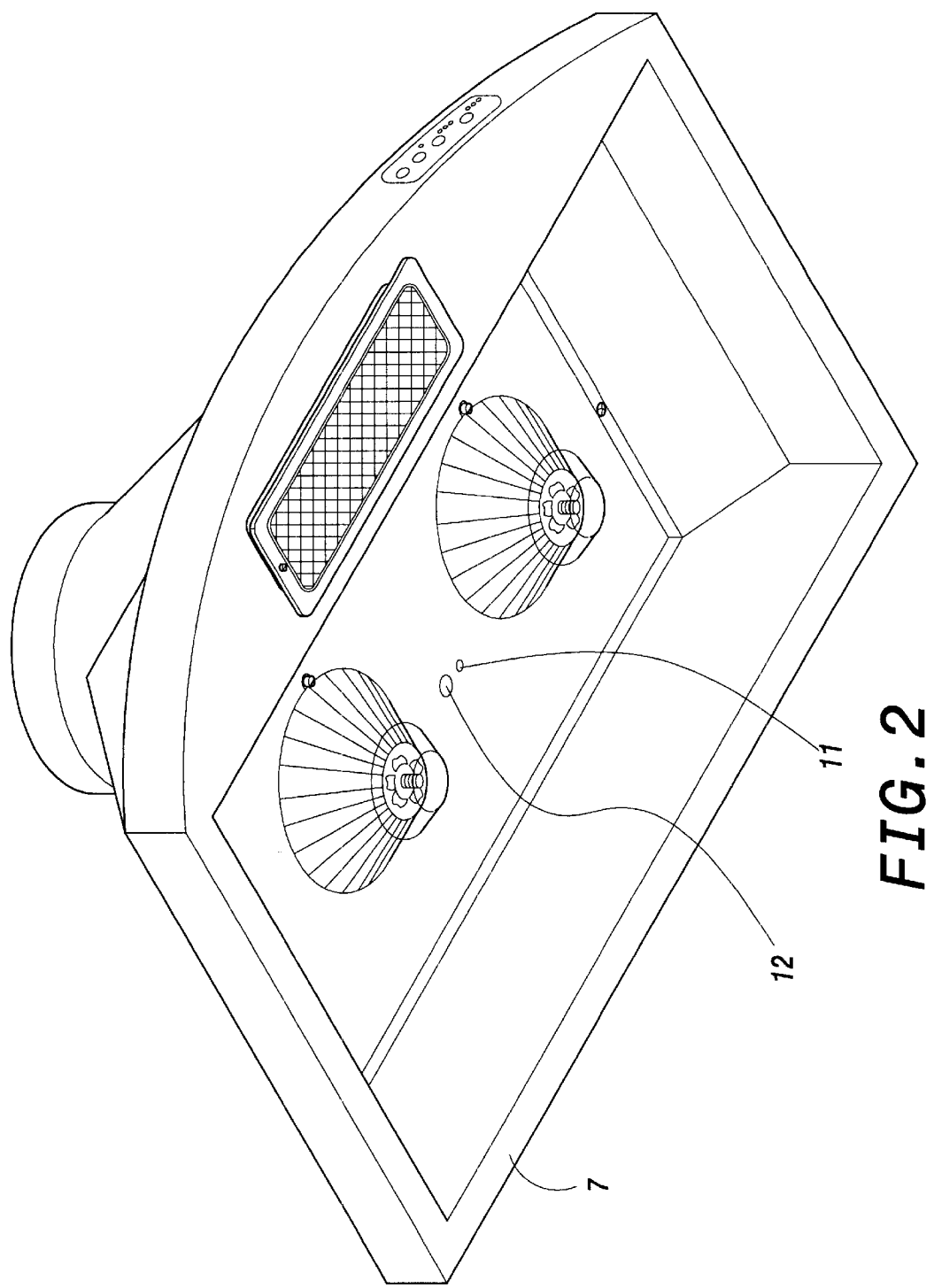
FIG. 2 is a perspective view of a smoke exhauster for cooking with the sensor of the present invention installed therein.
Figure 3:
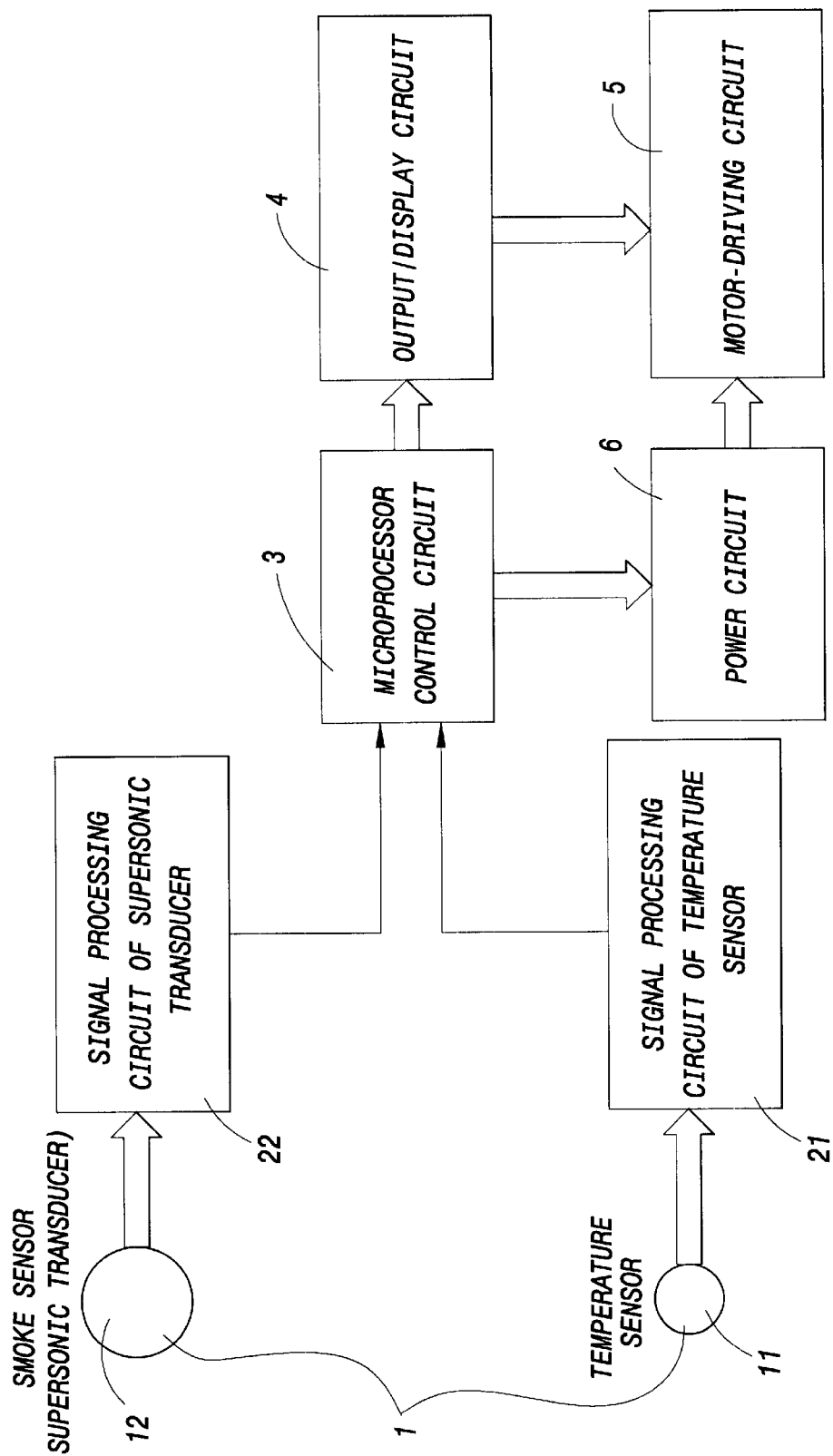
FIG. 3 is a circuit block diagram of the present invention.
Figure 4:
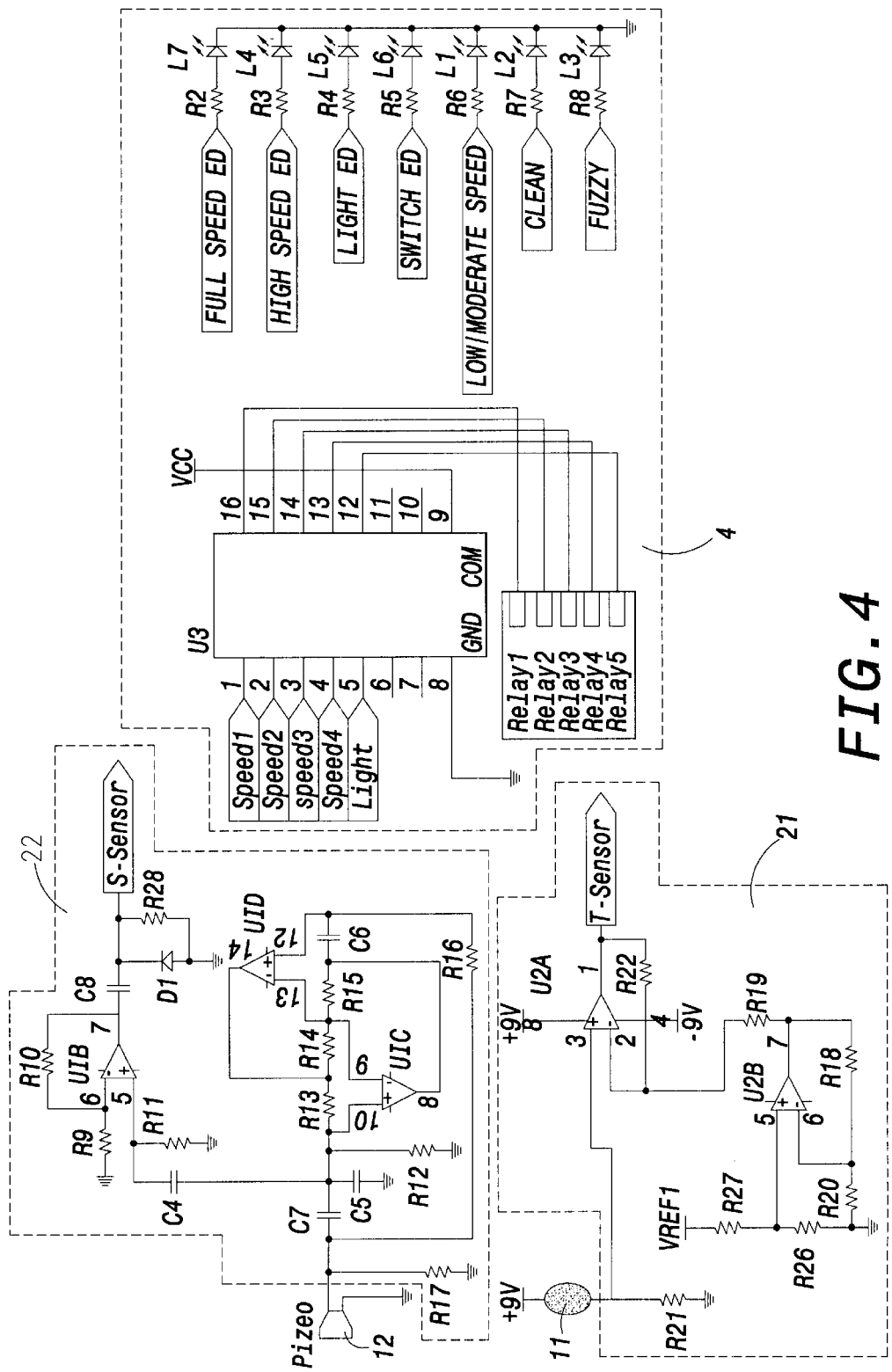
FIG. 4 shows circuit diagrams of the sensing circuit, the signal processing circuit of temperature sensor, the signal processing circuit of supersonic transducer, and the output and display circuit of the present invention.
Figure 5:
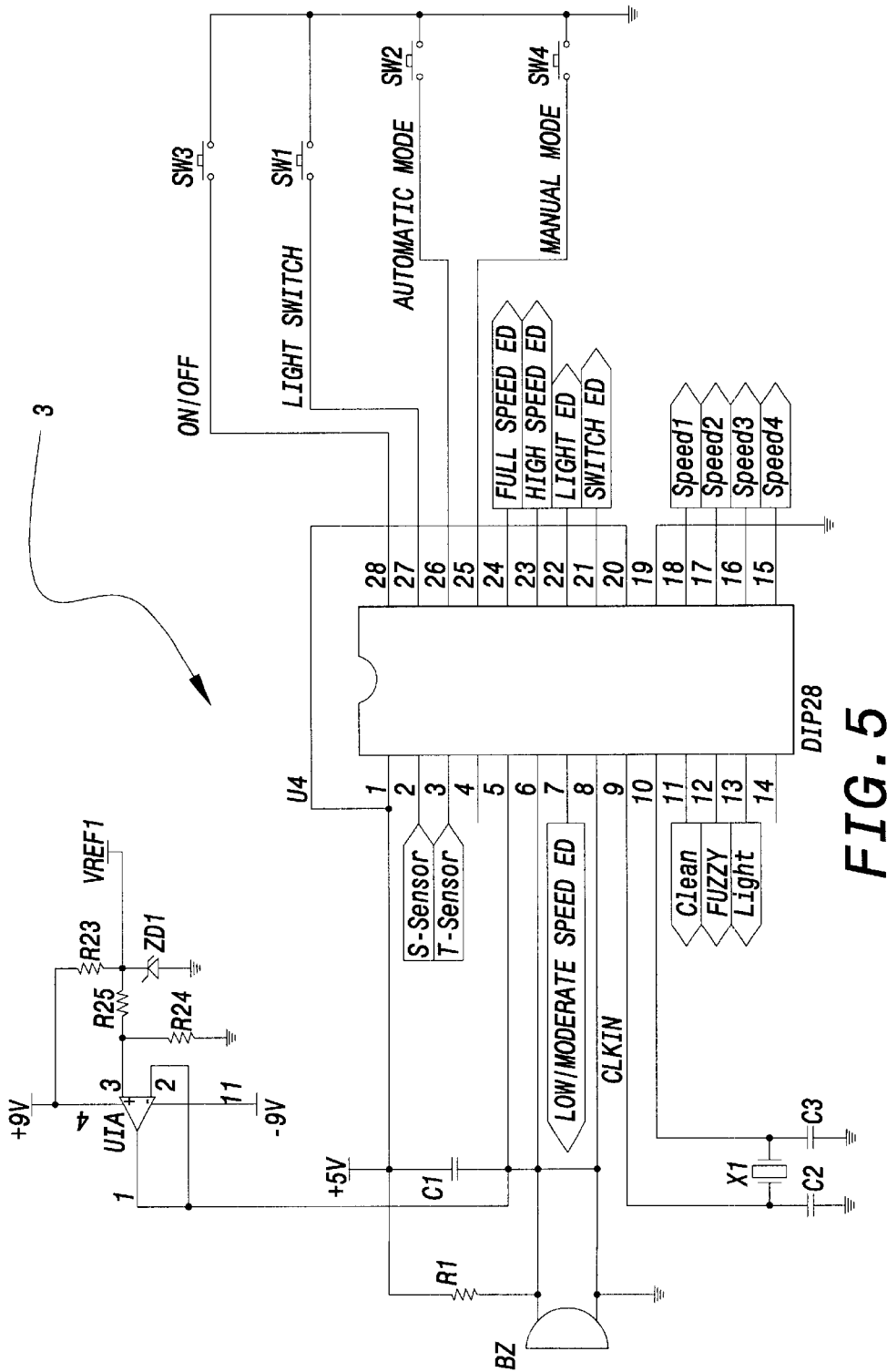
FIG. 5 is a circuit diagram of the microprocessor control circuit of the present invention.
Figure 6:
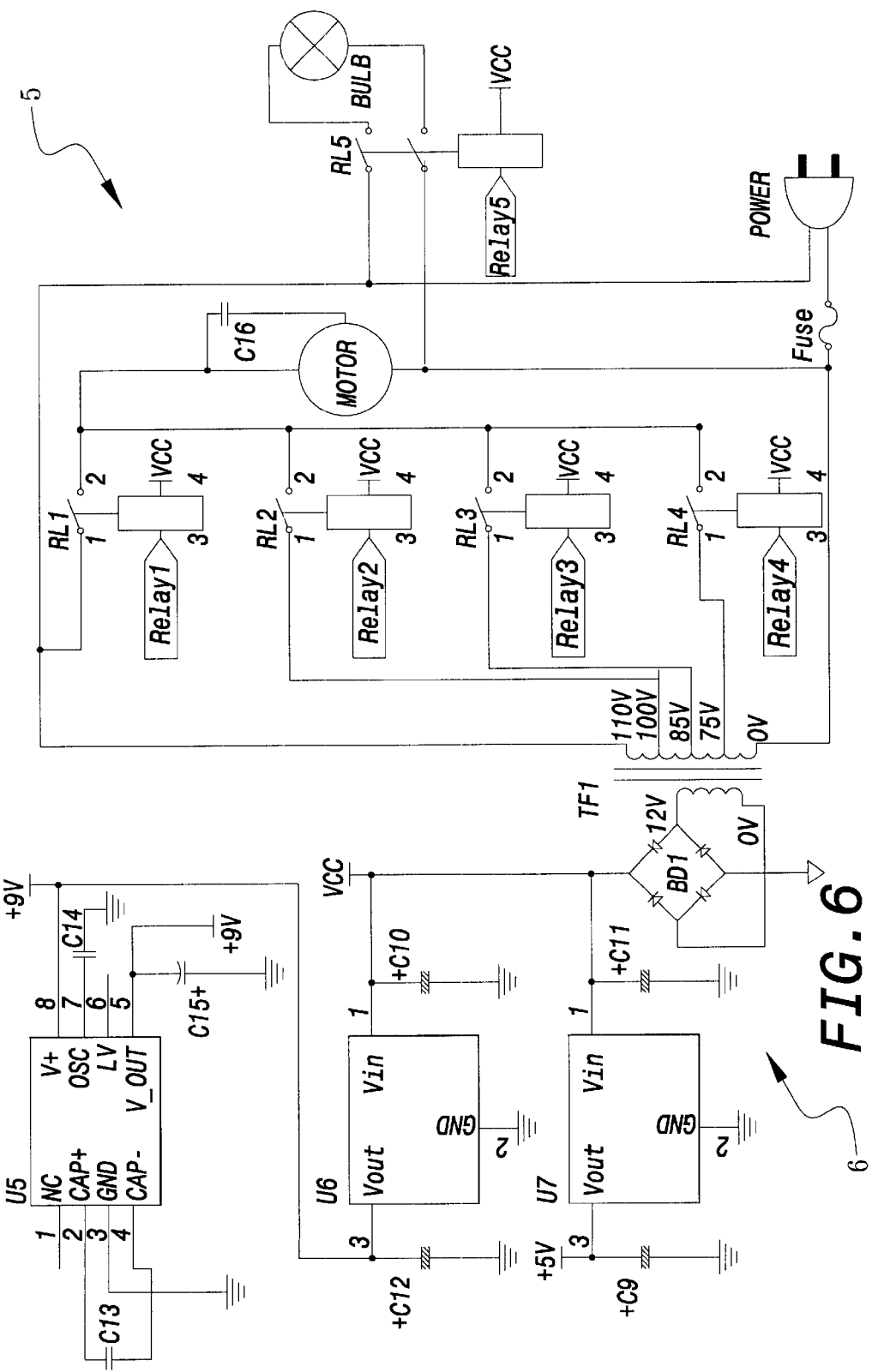
FIG. 6 shows circuit diagrams of the power circuit and the motor driving circuit of the present invention.

The present invention proposes a smart circuit device of a smoke exhauster for cooking. Please refer to FIGS. 1 to 6.

The smart circuit device of the present invention comprises a sensing circuit 1, a signal processing circuit of temperature sensor 21, a signal processing circuit of supersonic transducer 22, a microprocessor control circuit 3, an output and display circuit 4, a motor driving circuit 5, and a power circuit 6.

The power circuit 6 is formed by connecting a bridge rectifier BD1, voltage-regulating ICs U6 and U7, capacitors C9 to C15, and so on. The power circuit 6 is used to rectify and regulate input AC power so as to provide electricity for other circuits.

The sensing circuit 1 comprises a temperature sensor 11 for detecting the variation of temperature and a supersonic transducer (smoke sensor) 12 for detecting the quantity of smoke in the cooking environment. The supersonic transducer 12 is a sealed supersonic component, which can be installed on outdoor equipment or in dusty places. The sealed supersonic transducer 12 is an integrally formed metal shell with the front sealed plane as the vibration membrane. The first higher order harmonic is selected as the working frequency. The back of the supersonic transducer is sealed by transfusing resin to block the influence of ambient environment. The supersonic transducer 12 exploits the piezoelectric effect to detect the impact of heat flow so as to judge the size and the variation of the concentration of smoke.

The temperature sensor 11 is a sealed semiconductor temperature-sensing component for measuring the value of temperature to assist the smoke sensor 12.

In one embodiment of the present invention, the supersonic transducer 12 is installed on a central frame plate of a smoke exhauster for cooking 7. As shown in FIG. 1, because the supersonic transducer is situated above a gas stove 8, it can be used to detect the variation of the quantity of smoke. After the processing of filtering, amplifying, and A/D converting circuits, the results are input to a microprocessor for controlling the rotation speed of the motor.

When the supersonic transducer 12 detects the variation of heat flow, a low-frequency voltage signal, whose amplitude and slope is related to the variation of heat flow, will be output. After noise of frequency higher than 7 Hz is filtered by a low-pass filter, the amplitude and slope of the signal is analyzed and processed so that the magnitude of heat flow can be discriminated preliminarily. When the magnitude of heat flow increases, the voltage signal output from the supersonic transducer 12 will also increase.

The signal processing circuit of temperature sensor 21 is formed by connecting ICs U2A and U2B and resistors R19 to R22, R26, and R27. The input of the signal processing circuit of temperature sensor 21 is connected to the temperature sensor 11.

The signal processing circuit of temperature sensor 21 is used to amplify and compensate the signal detected by the temperature sensor 11 and to transfer the output signal to the microprocessor control circuit 3 for processing.

The signal processing circuit of supersonic transducer 22 is formed by connecting ICs U1B, U1C, and U1D, resistors R8 to R17 and R28, capacitors C4 to C8, a diode D1, and so on. The input of the signal processing circuit of supersonic transducer 22 is connected to the supersonic transducer 12. The signal processing circuit of supersonic transducer 22 is used to amplify the signal receiver by the supersonic transducer 12 and filter out noise of frequency higher than 7 Hz, and to transfer the output signal to the microprocessor control circuit 3 for processing.

The microprocessor control circuit 3 is formed by connecting a micro-controller U4, an IC U1A, resistors R1 and R23 to 25, capacitors C1 to C3, a quartz crystal X1, switching-mode switches SW2 and SW4, control switches SW1 and SW3, a Zener diode ZD1, and a buzzer BZ. The microprocessor control circuit 3 is respectively connected to the outputs of the signal processing circuit of temperature sensor 21 and the signal processing circuit of supersonic transducer 22. The output of the microprocessor control circuit 3 is connected to the output and display circuit 4 formed by connecting an interface IC U3, LEDs L1 to L7, resistors R2 to R8, and so on. The output of the output and display circuit 4 is connected to the motor-driving circuit 5 formed by connecting a motor, relays RL1 to RL5, a capacitor C16, a self-induction transformer TF1, a bulb, and so on.

The microprocessor control circuit 3 is used to process signal and control input and output. When the quantity of smoke increases abruptly, the microprocessor control circuit 3 will immediately increase the rotation speed of the motor to eject smoke. When the quantity of smoke is moderate and continual, the rotation speed of the motor will be increased to acquire a sufficient suction force to eject smoke. When the quantity of smoke decreases and lasts for a period of time, the rotation speed of the motor will be decreased gradually to a proper value. Meanwhile, the temperature-sensing component detects the variation of temperature uninterruptedly. A way of detecting absolute value and variation of the quantity of smoke for control is adopted so that the motor of the smoke exhauster for cooking 7 will still operate at a lowest rotation speed even though there is very little quantity of smoke but a temperature difference still exists, such as the situation when braising food or the pot is empty. Thereby, hot air or exhaust generated when gas is burned will be ejected. Because the microprocessor control circuit 3 comprises the switching-mode switches SW2 and SW4, the control switches SW1 and SW3, and the buzzer BZ, it can accept the control of the user and inform the user of the state of use.

Except displaying the state of use of the smoke exhauster for cooking 7, the output and display circuit 4 can also be used as a buffer interface between the microprocessor control circuit 3 and the motor-driving circuit 5 to protect the microprocessor from damage due to failure of other circuits.

The motor-driving circuit 5 is controlled by the signal from the microprocessor control circuit 3 to change the rotation speed of the motor. The motor-driving circuit 6 also provides required illumination for the user.

Cooking smoke is hot air having moisture or oil vapor. When the hot air rises, it will impact the supersonic transducer 12 installed below the smoke exhauster for cooking 7. The signal of the supersonic transducer 12 will be transferred to the microprocessor control circuit 3 via the signal processing circuit of supersonic transducer 22. The microprocessor control circuit 3 will operate according to the fuzzy control theory. When the quantity of smoke increases abruptly or the quantity of smoke is moderate and continual, the rotation speed of the motor will be increased immediately to eject smoke.

When the quantity of smoke decreases and lasts for a period of time, the rotation speed of the motor will be decreased gradually to a proper value. Meanwhile, the temperature-sensing component detects the variation of temperature uninterruptedly. A way of detecting absolute value and variation of the quantity of smoke for control is adopted so that the motor of the smoke exhauster for cooking 7 will still operate at a lowest rotation speed even though there is very little quantity of smoke but a temperature difference still exists. Thereby, hot air or exhaust generated when gas is burned will be ejected.

To sum up, the present invention provides a smart circuit device of a smoke exhauster for cooking, which device can detect the variations of the quantity of smoke and temperature in the cooking environment as input parameters to a fuzzy controller. Thereby, the motor of the smoke exhauster for cooking can be controlled to operate at a proper rotation speed so as to reduce noise, save energy, and achieve the object of automatic control. Moreover, the supersonic transducer of the present invention can be installed on outdoor equipment or in dusty places.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A smart circuit device of a smoke exhauster for cooking, said device comprising:

a temperature-sensing component for detecting a variation in temperature and output of a signal responsive thereto;

a sealed supersonic transducer for detecting a quantity of smoke and output of a signal responsive thereto;

a temperature sensor signal processing circuit connected to said temperature-sensing component and used to amplify and compensate the signal output by said temperature-sensing component, and output a signal corresponding to the temperature detected by said temperature-sensing component;

a supersonic transducer signal processing circuit connected to said supersonic transducer and used to amplify and filter the signal output by said supersonic transducer, and output a corresponding signal, said signal output by said supersonic transducer signal processing circuit having a frequency not greater than 7 Hz and varying in both amplitude and slope;

a microprocessor control circuit respectively connected to said temperature sensor signal processing circuit and said supersonic transducer signal processing circuit and used to receive the signals from said temperature sensor signal processing circuit and said supersonic transducer signal processing circuit and transfer said signals to a microcomputer database subsequent to an analog-to-digital conversion thereof;

a motor-driving circuit connected to said microprocessor control circuit for receiving a signal from said microprocessor control circuit to control rotational speed of a motor of the smoke exhauster responsive to said signals received from at least one of said temperature sensor signal processing circuit and said supersonic transducer signal processing circuit; and a power circuit providing electricity for each said circuit;

whereby responsive to detection of smoke or a rise in temperature, said microprocessor control circuit will operate according to a fuzzy control theory so that the motor of the smoke exhauster is automatically adjusted to operate at a proper rotational speed.

2. The smart circuit device of a smoke exhauster for cooking as claimed in claim 1, wherein said sealed supersonic transducer can be installed on a central frame plate of the smoke exhauster for cooking.

3. A smart circuit device of a smoke exhauster for cooker, said device comprising:

a temperature-sensing component for detecting a variation in temperature and output of a signal responsive thereto;

a sealed supersonic transducer for detecting a quantity of smoke and output of a signal responsive thereto;

a temperature sensor signal processing circuit connected to said temperature-sensing component and used to amplify and compensate the signal output by said temperature-sensing component, and output a signal corresponding to the temperature detected by said temperature-sensing component;

a supersonic transducer signal processing circuit connected to said supersonic transducer and used to amplify and filter the signal output by said supersonic transducer, and output a corresponding signal;

a microprocessor control circuit respectively connected to said temperature sensor signal processing circuit and said supersonic transducer signal processing circuit and used to receive the signals from said temperature sensor signal processing circuit and said supersonic transducer signal processing circuit and transfer of said signal to a microcomputer database subsequent to an analog-to-digital conversion thereof, said microprocessor control circuit providing motor control signals responsive to said signals received from at least one of said temperature sensor signal processing circuit and said supersonic transducer signal processing circuit;

a motor-driving circuit coupled to said microprocessor control circuit for receiving said motor control signals from said microprocessor control circuit to control rotational speed of a motor of the smoke exhauster;

an output and display circuit connected between said microprocessor control circuit and said motor-driving circuit to transfer said motor control signals to said motor-driving circuit and display a state of use of the smoke exhauster, said output and display circuit including a buffer interface between said microprocessor control circuit and said motor-driving circuit; and, a power circuit providing electricity for each said circuit.

* * * * *